UNITED STATES PATENT OFFICE.

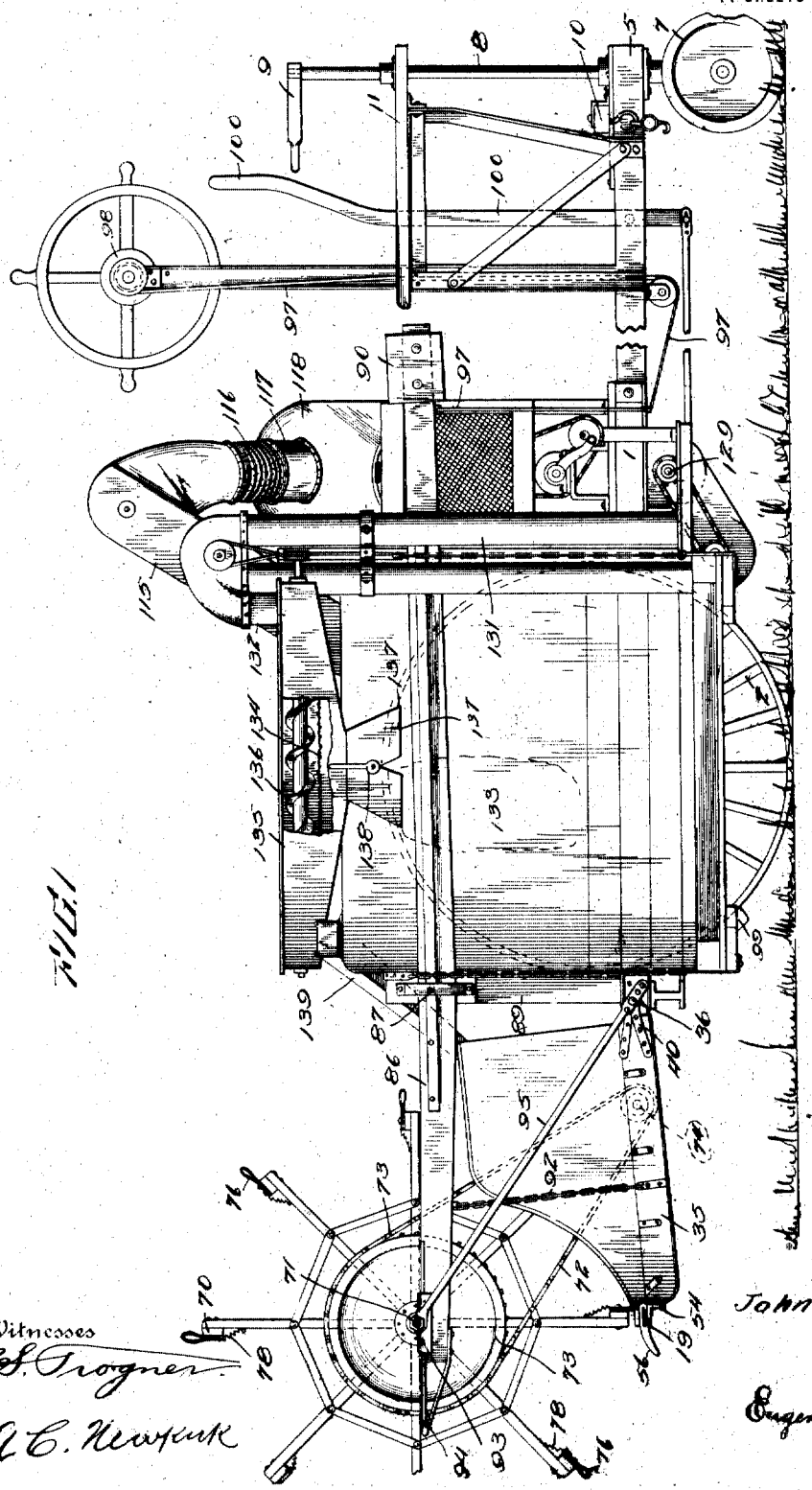

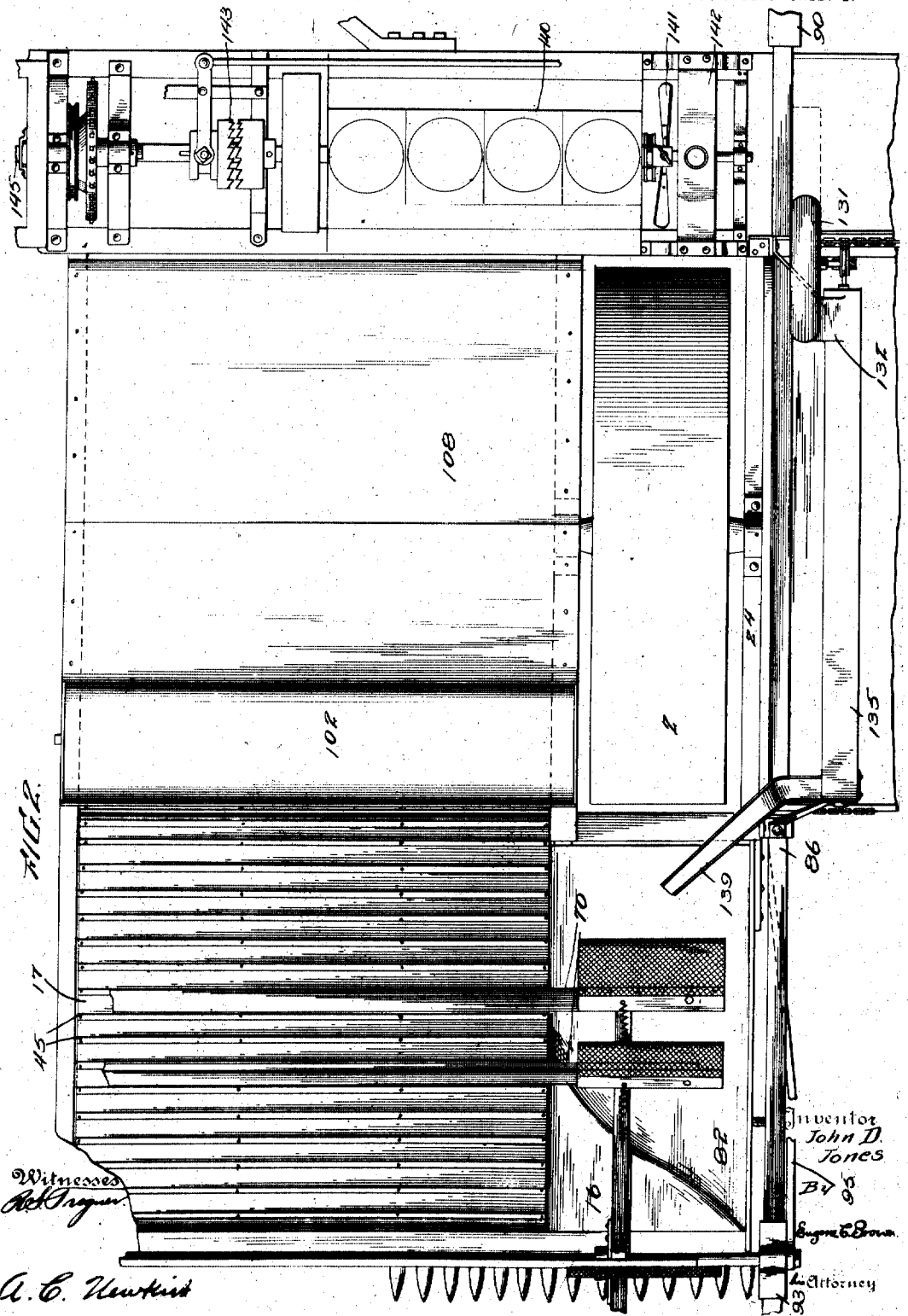

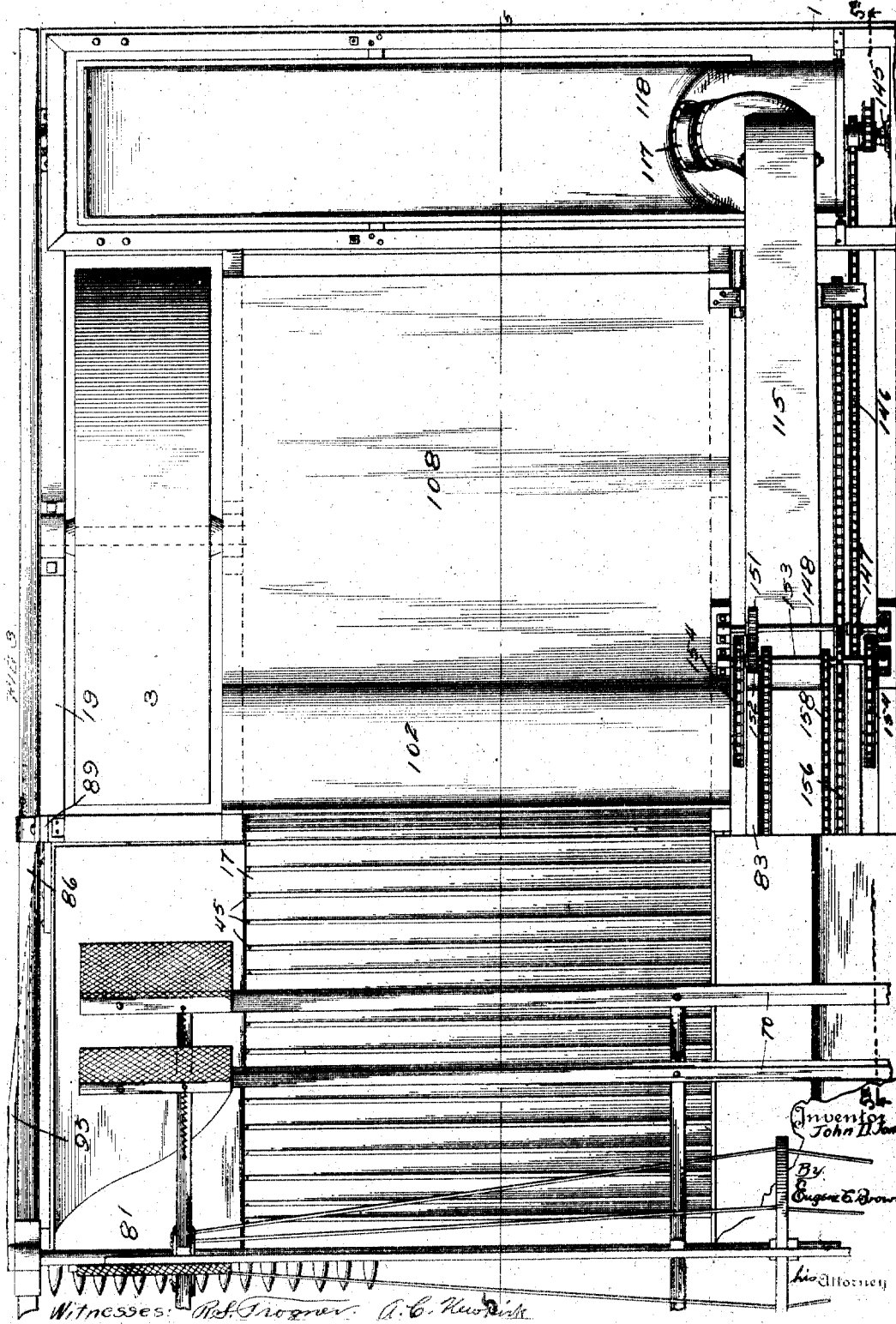

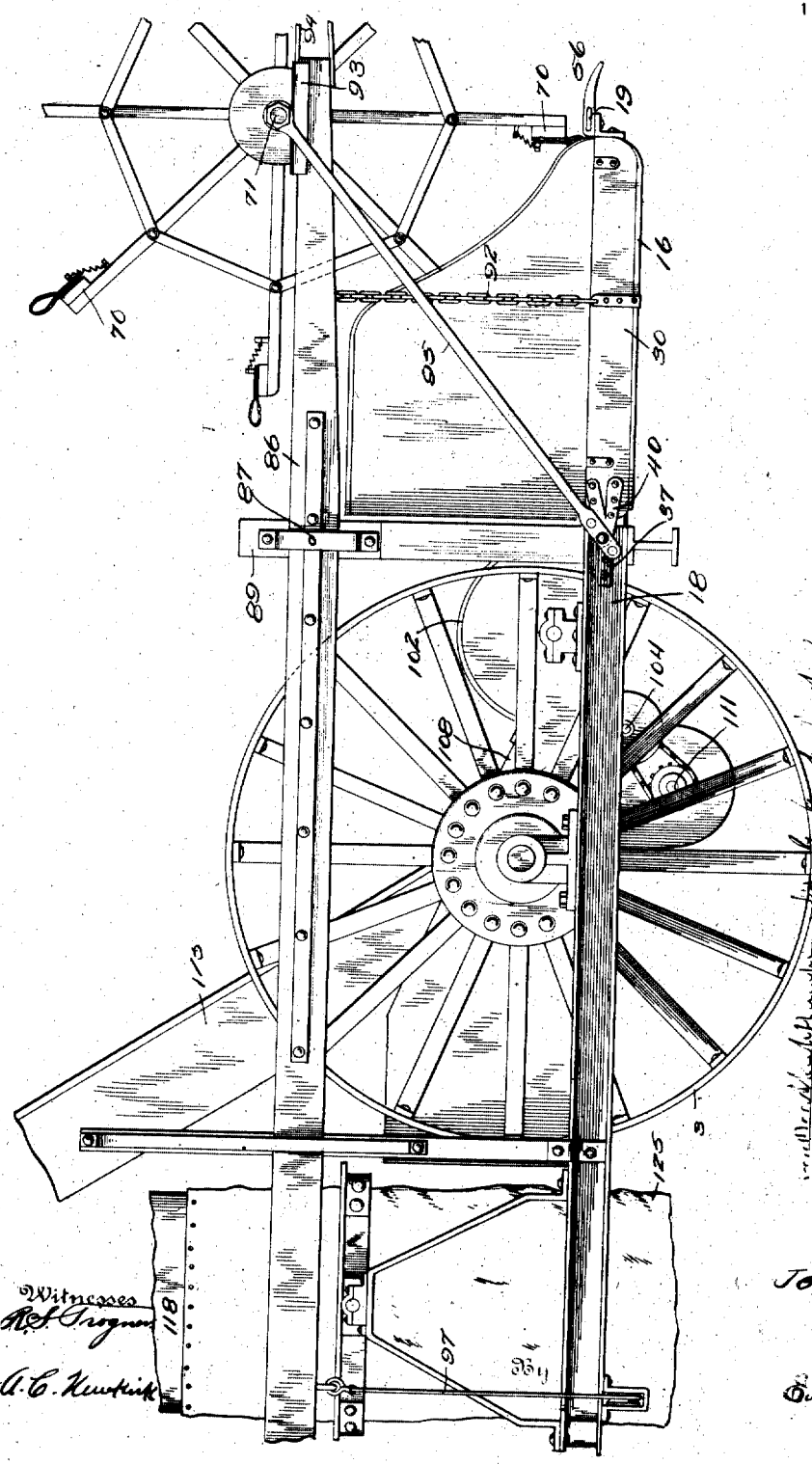

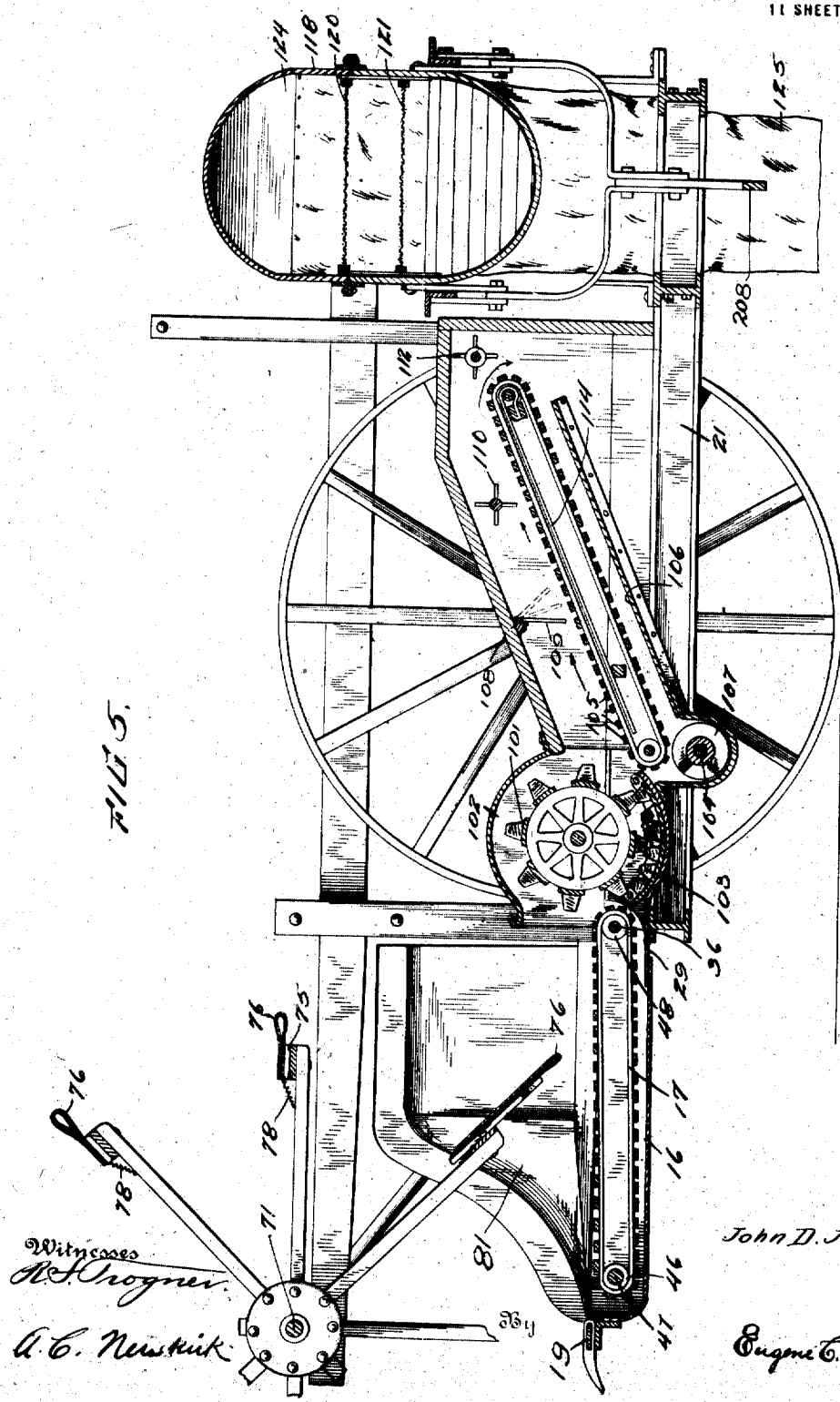

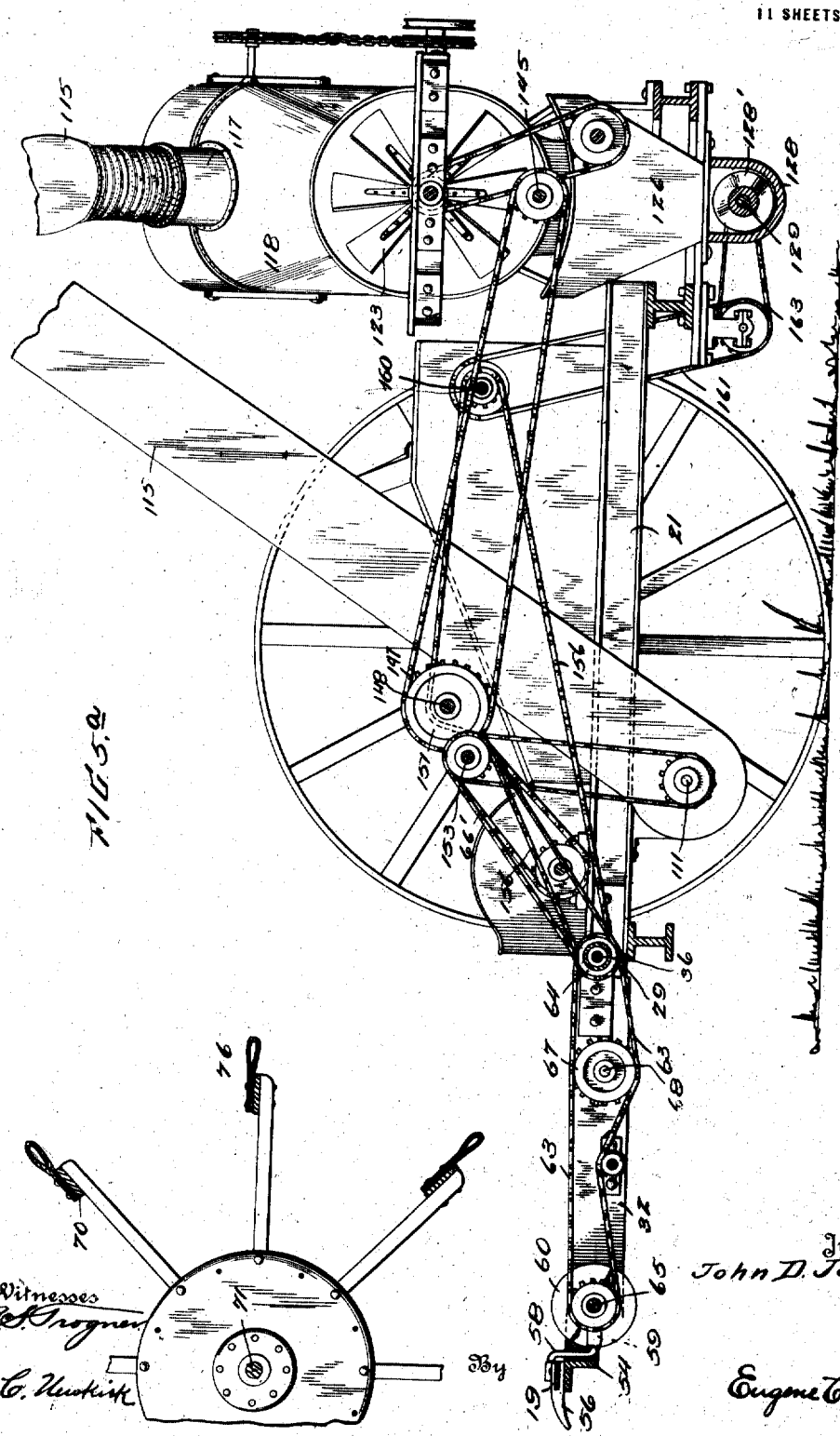

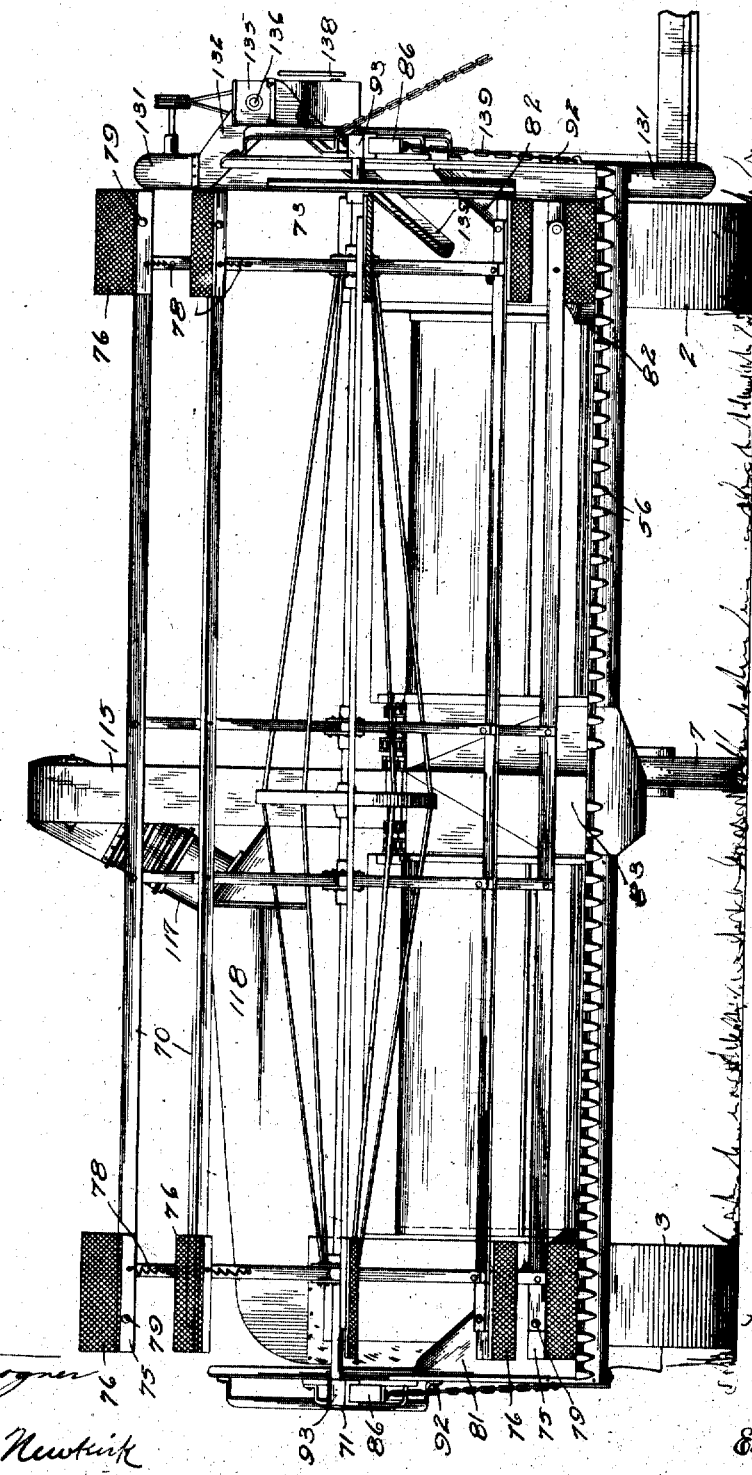

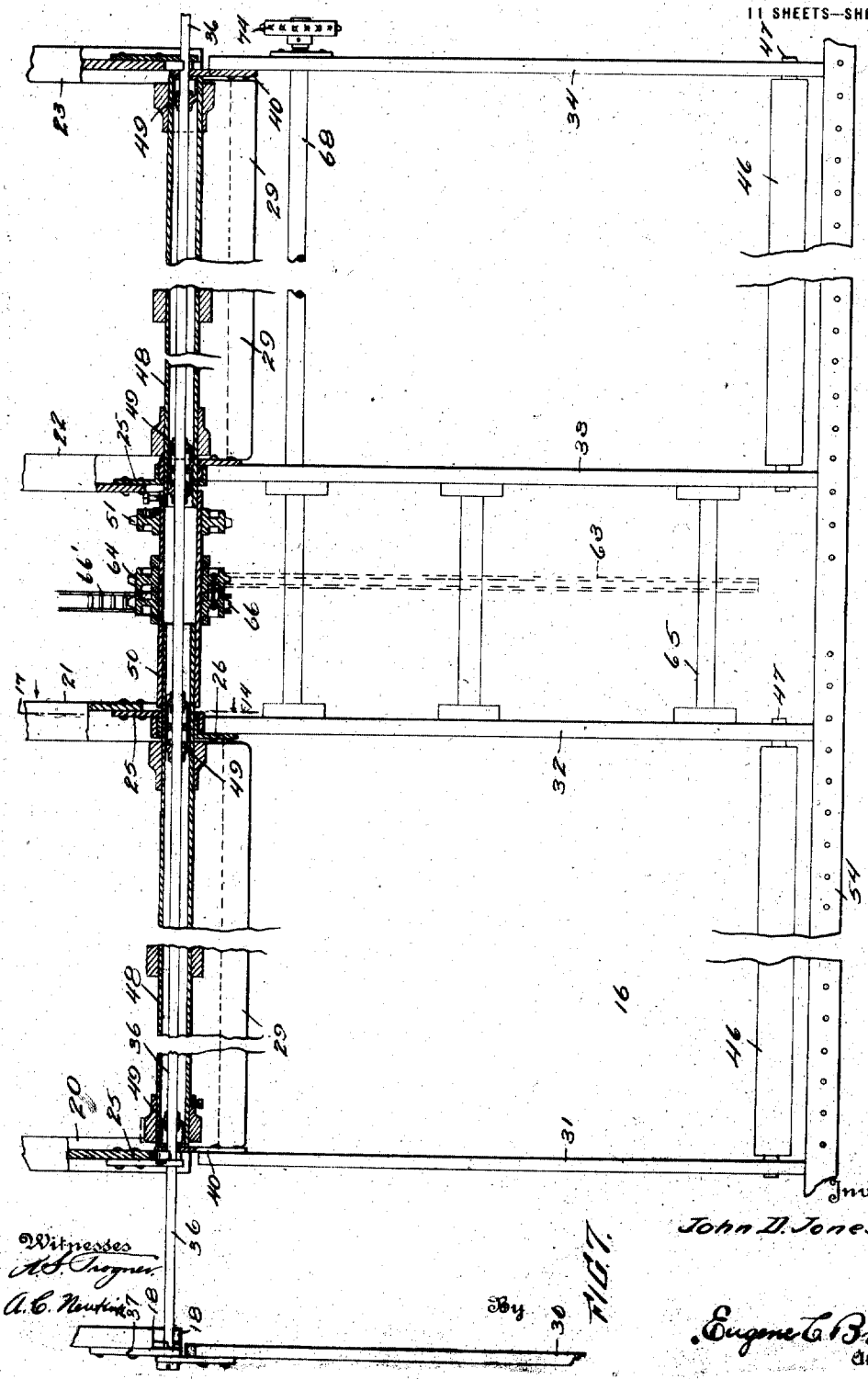

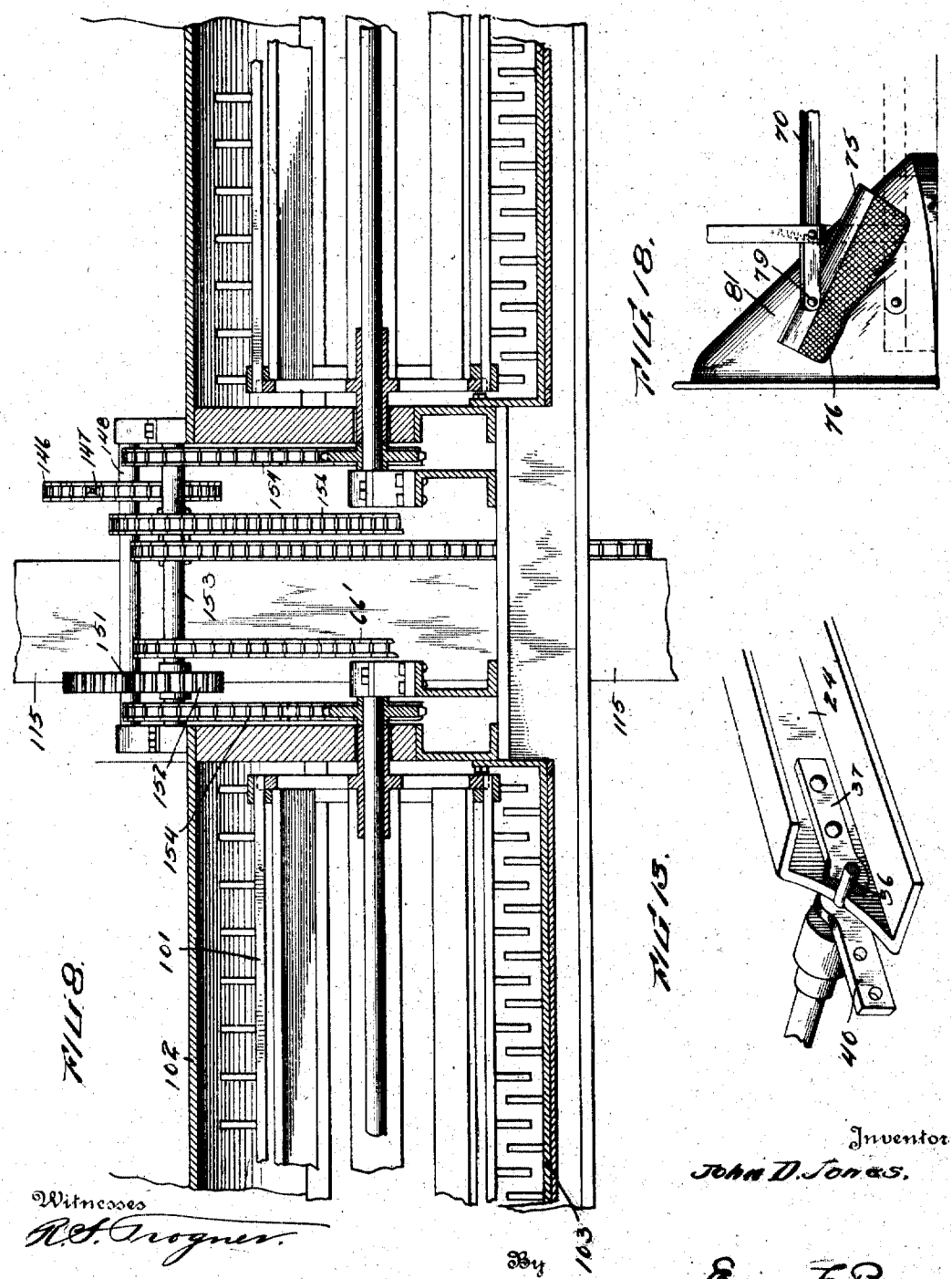

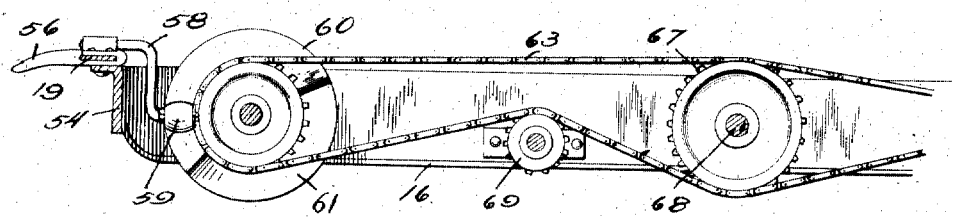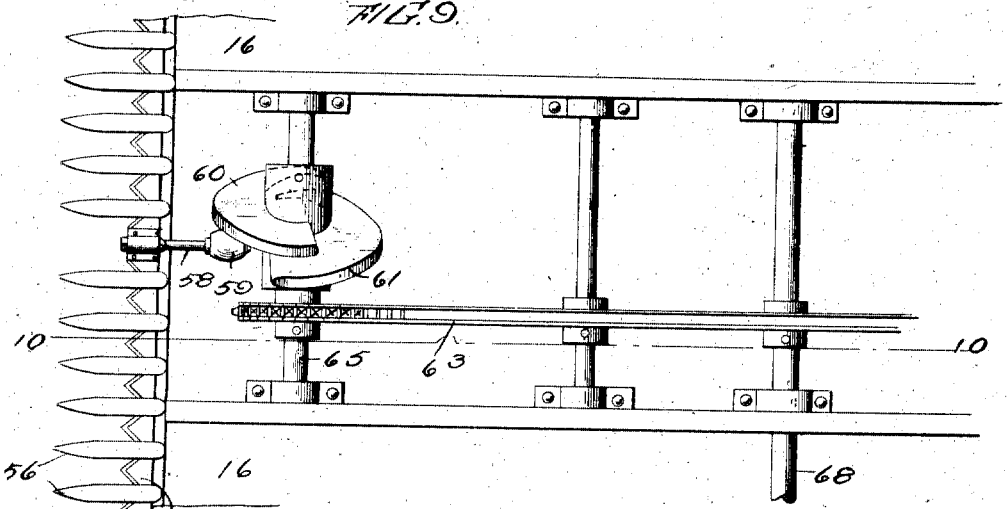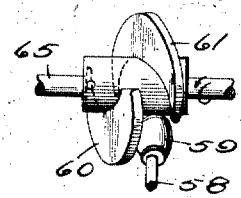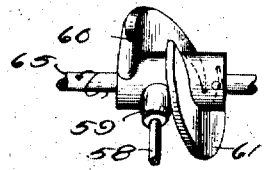

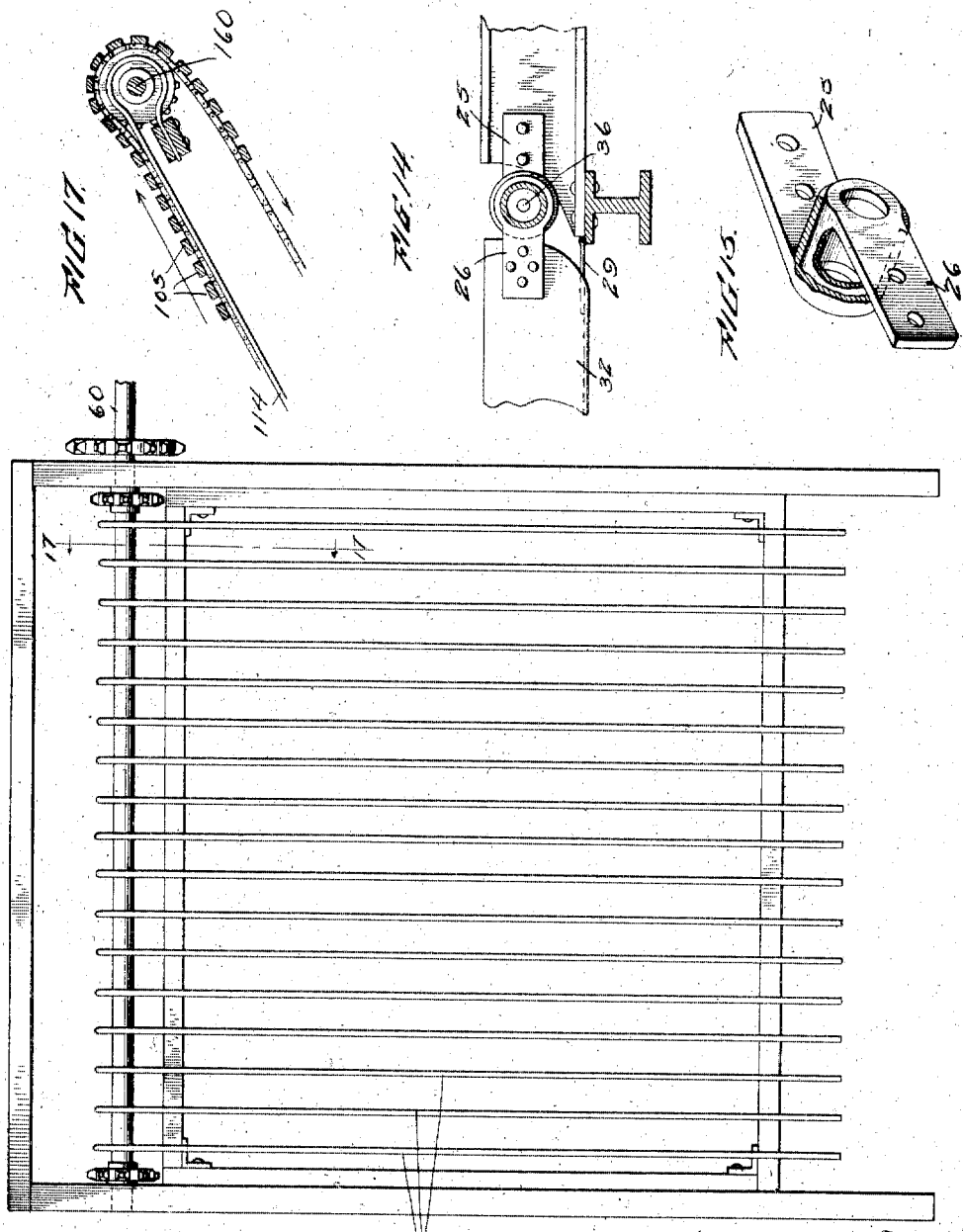

JOHN D. JONES, OF WALLA WALLA, WASHINGTON

HARVESTING AND THRESHING MACHINE.

1,281,582. Specification of Letters Patent. Patented Oct. 15, 1918.

Continuation in part of application Serial No. 744,021, filed January 24, 1913. Renewed January 28, 1915, Serial No. 4,950. This application filed January 29, 1915, Serial No. 5,132. Renewed March 14, 1918. Serial No. 222,513.

*To all whom it may concern:*

Be it known that I, JOHN D. JONES, a citizen of the United States, residing at Walla Walla, in the county of Walla Walla and State of Washington, have invented certain new and useful Improvements in Harvesting and Threshing Machines, of which the following is a specification.

This invention relates to harvesting and threshing machinery and has for an object to provide an improved mechanism for harvesting, threshing, cleaning and separating the grain.

A further object of the invention is to provide a harvesting machine having a main frame carrying threshing and separating mechanism, and an auxiliary frame hinged in front of the main frame and carrying the harvesting mechanism, the auxiliary frame being hinged to the main frame concentric with the means for transmitting motion from the prime mover to the harvesting machinery so that the auxiliary frame can be raised or lowered without interfering with the operation of the transmission mechanism.

A further object of the invention is to provide a machine having a cutter-bar extending the full width of the machine, and a reel having means for throwing the severed grain upon the endless aprons at a distance removed from the grain line and covering the line of travel of the traction wheels.

With these and other objects in view the invention comprises certain novel constructions, combinations and arrangement of parts as will be hereinafter more fully described and claimed.

In the drawings:

Figure 1 is a side elevation of a harvesting machine embodying my invention seen from the delivery side, *i. e.*, the right-hand side when facing the front; Fig. 2, is a top plan view of the right hand half of the machine, looking toward the front; Fig. 3 is a top plan view of the left-hand half of the machine; Fig. 4, is an enlarged side elevation of the forward portion of the machine viewed from the left; Figs. 5 and 5ᵃ are vertical sections on the lines 5—5 and 5ᵃ—5ᵃ, respectively, of Fig. 3; Fig. 6 is a front elevation showing especially the reel and its driving connections; Fig. 7 is a diagrammatic plan view showing the rollers, and pivotal supports for the front apron and drapers; Fig. 8, is a sectional view of the threshing cylinders and the transmission mechanism therefor; Fig. 9, is a fragmentary top plan view of the cutter bar and its actuating mechanism; Fig. 10 is a longitudinal section on the line 10—10 of Fig. 9; Figs. 11 and 12, are detail views of the cam actuator for the cutter bar; Fig. 13 is an enlarged detail view showing the manner of securing the auxiliary platform to the main frame members; Fig. 14, is an enlarged sectional view on the line 14—14 of Fig. 7, showing the manner of hinging the auxiliary frame or apron to the main frame or platform; Fig. 15, is an enlarged detail view of the intermediate hinge members; Fig. 16, is a top plan view of the guard wires under the rattler rake or straw carrier; Fig. 17, is a fragmentary sectional view on the line 17—17 of Fig. 16, and Fig. 18 is a detail view of an end housing and one of the auxiliary reel slats showing the manner of tilting the slats.

The improved harvester and thresher which forms the subject matter of this application comprises a main frame or platform 1, supported upon ground wheels 2 and 3, the wheel 2 taking the place of the ordinary bull-wheel in harvesting machinery while the wheel 3 takes the place of the ordinary grain wheel. The main frame is further provided with a beam 5 extending to the rear thereof and provided with a caster wheel or rudder 7 pivotally mounted thereon by means of a vertical shaft 8 carrying a tiller 9 and with draft applying means, as the evener 10, pivoted upon said beam 5. The horses are attached to the evener 10 and the driver may stand on the platform 11, astride the tiller 9, to manipulate the caster wheel or rudder 7 in guiding the machine as it advances under the pull of the draft animals.

An auxiliary frame 16 is hinged to the front of the main frame or platform and carries the traveling aprons or drapers 17, and the cutter-bar 19. Inasmuch as this front auxiliary frame or cutting table must be raised or lowered to bring the cutter-bar to the proper elevation adapted to the varying heights of the grain to be harvested, it is important that the auxiliary frame should be hinged to permit movement while maintaining a close fit at the joint or meeting edge with the main platform in order that no straw or grain may fall therebetween. Furthermore the raising or lowering of this cutting table 16, should not interfere with the operation of the driving mechanism carried thereby to actuate the apron-carriers and the cutter-bar; nor should such movements of the auxiliary frame necessitate any change or adjustment of the driving mechanism. My invention overcomes the defects in prior machines in these respects. I mount the driving gears and the inner rollers of the drapers or aprons concentric with the hinge members, and in order that the pintle rod or shaft passing through the hinges shall not carry the weight of the auxiliary platform, I make said rod non-rotatable so that it acts merely to connect the parts of the end hinges and I further provide intermediate hinges constructed to relieve the rod of the weight of the auxiliary platform and also to form external bearings for the rollers which carry the drapers.

The construction of the hinge joint between the main and auxiliary platforms and the transmission mechanism concentric therewith is shown in Figs. 7, 14 and 15. To the front end of each of the central longitudinal frame members 21 and 22, is bolted one hinge part 25, the complementary hinge part 26 being bolted to the inner ends of the frame members 32 and 33 of the auxiliary platform, the two parts interfitting as shown in Fig. 15 and forming a smooth interior bore.

The pintle rod 36 passes through said tubular hinge members and is non-rotatably held in the outside frame members in the manner shown in Fig. 13. The outside frame members 30 and 35 and the intermediate members 31 and 34 of the auxiliary platform carry the rod 36, by means of brackets 40, shown in Fig. 13, having an eye through which the rod passes. The forward ends of the corresponding frame members 18, 20, 23 and 24 of the main platform are notched to form a seat for the rod 36, the rod being secured in the notches by eyeplates 37 passing over the rod and bolted to the frame members. The auxiliary platform with the attached drapers may be readily disconnected from the main platform by removing the bolts from the end plates 37 and from the intermediate hinge members 25. A hinged flap 29, closes the narrow slot between the bottom of the auxiliary platform and the main platform.

The traveling aprons or drapers 17, are carried at the forward end by rollers 46, having interior bearings revoluble on the rods 47, and at the inner or rear ends by the rollers 48, which are provided with interior bearing hubs 49 rotating upon the pintle rod 36. The rollers 46 pass through the tubular bore of the central hinges 25, which form exterior bearings and support the weight of the rollers and the apron carriers, thereby relieving the rod 36. By this construction I am enabled to reduce the weight of these parts to a minimum, requiring a pintle rod of comparatively small diameter. The rollers 48 upon either side of the platform are united by a central sleeve 50, carrying a gear 51 by which power is transmitted to operate the drapers. An idler 66 rotating on the sleeve 50 and driven by a sprocket chain 66' from the shaft 153, carries a gear 64, by which power is transmitted through sprocket chain 63 to actuate the cutter-bar.

The transverse member 54 at the front of the auxiliary frame is preferably an angle bar to which the prongs 56 are secured and upon which rests the reciprocatory cutter-bar 19. The latter is reciprocated by means of an arm 58, fastened to the cutter-bar and carrying a roller 59, which is engaged alternately by the cam-shaped wings or ribs 60, 61. The ends of the cam ribs overlap so that the roller engages one before leaving the other. The sprocket chain 63, which transmits power from the gear 64 to the shaft 65, carrying the cams 60 61, also engages the sprocket 67 to drive the shaft 68, the chain being maintained taut by passing over an idler 69.

The reel is constructed for the most part as usual with slats 70, carried by a reel frame rotatable on the shaft 71, and operated by a sprocket chain 72, passing over a gear 73 on the end of the reel frame and driven by the gear 74 on the shaft 68. In order to enable the threshing machine to cut the grain to the full width of the machine, I provide auxiliary reel extensions projecting beyond the slats and over the line of travel of the ground wheels. These extensions may consist of flexible devices such as leather pieces secured to the ends of the slats but in general I prefer to provide auxiliary slat sections 75, pivoted intermediate their ends on the reel-slats and having flexible brush portions 76, which may be made of wire gauze or other suitable material. The auxiliary slats are yieldingly held in alinement with the slats by springs 78 but may rock on their pivots 79, in passing over the housings or apron extensions on the ends of the front platform.

As previously stated, one of the objects of my invention is to provide means for cutting the grain over the entire width of the machine which may be driven at any point into a field of standing grain since no grain remains uncut in the path of travel to be traversed by the wheels. For this purpose I provide apron extensions or housings 81, and 82 upon either end of the aprons at the front of the auxiliary platform which project over the line of travel of the ground wheels, the cutter-bar also extending in front of these housings. The housings are shaped to guide the severed grain toward the traveling aprons or drapers, and slant upwardly from the front and slope laterally inward as indicated, forming substantially a vertical section of a pyramid with an outwardly sloping base.

As the revolving reel slats successively bring the grain over the cutter-bar, and brush the severed grain upon the drapers, the extension slats 75, come into contact with the slanting sides of the housings and are thereby tilted on their pivots 79, following the curvature of the housings, as shown in Fig. 18, which causes the severed grain in front of the projecting housings to be thrown inwardly upon the drapers. Thus the grain is entirely cut from the line of travel of the wheels and of the draft animals.

I also provide a central wedge-shaped housing 83, which covers the cutter-bar driving mechanism between the two drapers and directs the grain thereon.

The reel and the auxiliary draper platform are carried by beams 86, pivoted at 87 to standards 89, at the forward end of each side of the main platform, the weight of the reel and front platform being nearly counterbalanced by the weights 90, on the rear end of the beams. The pivoted platform is supported by chains 92, and the boxes 93, forming the end bearings for the reel-axle 71, are slidably mounted upon track bars 94, secured to the ends of the beams. In order to maintain a definite relation between the cutter-bar and the reel, it is necessary that the axle shaft 71, of the reel should move toward or from the pivot 87, as the beams 86 are raised or lowered to adjust the elevation of the cutter bar to adapt it to the height of the grain to be cut. In prior machines it has been necessary to manually readjust the position of the reel after each change in the elevation of the pivoted platform. To effect an automatic adjustment which maintains a fixed relation between the reel and cutter-bar, I provide rods 95 connecting the ends of the reel shaft with the hinge rod 36, which causes the bearing boxes 93 to slide forward or backward on the beams 86, as the parts are raised or lowered, so that the cutter-bar and reel shaft swing together about the same pivot rod 36. The elevation of the beams 86 controlling the height of the front platform and reel may be adjusted by winding or unwinding a cable 97 on the drum of the windlass 98. The ground wheel brake 99 is operated by a brake-lever 100.

The grain and straw are delivered by the drapers 17, directly to the threshing cylinder, 101, under the cover 102, the inner end of the draper being closely adjacent the edge of the cylinder concave 103 and the slats 45, of the draper successively closing the joint at the hinge between the front and main platforms so that no straw can fall between. The structural features of the threshing cylinder form the subject-matter of my co-pending application, Serial Number 749,097, filed Feb. 18, 1913, and renewed April 2, 1914.

The threshed grain is thrown from the cylinder onto the endless rattler rakes 105, the grain falling between the slats and being conducted by the inclined bottom wall or pan 106 to the worm conveyer 107 on the shaft 104. The straw is carried upwardly and discharged from the end of the rattler, any tendency to choking in the channel between the cover 108 and the slats being prevented by the action of the swinging gate 109 and the revolving beaters 110 and 112, which are connected in any suitable manner with the driving mechanism. To prevent any straw from falling between the slats I place a series of longitudinal guard wires 114 under the upper slats and continue the upper ends of the wires around the shaft of the upper roller in the manner shown in Fig. 17.

The grain is conveyed by the worm 107 to the elevator 115, by which it is discharged through the hopper 117 into the grain separator and cleaner 118, the structural features of which form the subject-matter of my co-pending application Serial Number 4321, filed January 25, 1915.

In passing through the separator and cleaner, the grain falls through the oscillating sieves 120, and 121, the chaff being carried by the air-currents from the fan-blower 123, through the chaff channel 124 into the discharge chute 125. The cleaner casing is maintained in a horizontal position by a leveling device controlled by a weighted pendulum 127. The cleaned grain falls into the hopper 126 and is conveyed through the trough 128, by the worm 128 on the shaft 129, to the elevator 131 by which it is lifted and discharged through the spout 132 upon the screen 134, in the casing 135. The grain is distributed over the screen by a worm 136 and passes through one of the tin spouts 137, controlled by the valve 138, into the sacks 133. All unthreshed grain, or heads that reach the screen 134, are carried into the chute 139, which discharges upon the drapers and pass again through the threshing cylinders.

The operating mechanism of the harvesting and threshing machine is actuated by a gasolene or oil engine 140, which is preferably located at the rear of the main platform. I have indicated the usual cooling fan 141 and radiator 142 and the clutch 143 by which the engine is connected to the main power shaft 145.

Power is transmitted from the main shaft 145 through the sprocket chain 146 to the gear 147 on the shaft 148. A gear 151 on the shaft 148 meshing with the gear 152 on shaft 153, transmits power through sprocket chains 154 to the cylinders 101. Power is also transmitted from shaft 148 through sprocket chain 156 to gear 51 on the roller to actuate the drapers; and the shaft 160, which transmits power through the chains 161 and 163 to the worm shaft 129. The elevator-bucket shaft 111, and the worm shaft 104 may also be driven from the shaft 153 by sprocket chains.

It will be seen that I have concentrated the power transmitting mechanism within a narrow central channel extending longitudinally between the drapers, cylinders and rattler rakes. I have thus dispensed with long shaft transmission and crank motion commonly employed in harvesting machines and have devised a practically direct drive from the engine through sprocket chains connected by gearing carried on short shafts. This arrangement not only greatly simplifies the construction and reduces the vibration of the machinery but increases the efficiency of operation and reduces the operating expense.

The several advantages due to my invention will be appreciated by those familiar with harvesting machinery. The extension of the cutter-bar and the reel-extensions which coöperate with the housings in front of the traction wheels provide for the harvesting of all grain in the line of travel, so that none is lost or discarded. The automatic adjustment of the reel insures a proper feeding of the grain to the cutter-bar, thereby dispensing with manual adjustments usual after each change in elevation of the front platform. The manner of hinging the auxiliary platform concentric with the axis of the power transmission mechanism permits the platform to be raised or lowered without adjusting or interrupting the operation of the driving mechanism, and furthermore by making the draper rollers concentric with the hinge of the cutting table I am enabled to maintain a closed joint between the main and auxiliary platforms.

I have described in detail the particular construction illustrated in the accompanying drawings for the purpose of disclosing an embodiment of my invention but I am aware that various changes may be made within the scope of the appended claims and without departing from the spirit of my invention.

I claim:—

1. In a harvesting and threshing machine, a wheel-supported main frame, an auxiliary frame hinged to the front of the main frame, a cutter bar at the front of the auxiliary frame, a shaft extending through the hinge and held against rotation, rollers mounted upon the shaft, aprons carried upon the rollers and extending over the auxiliary frame, a prime mover, and transmission means connecting the prime mover and the rollers.

2. In a harvesting and threshing machine, a wheel-supported main frame, an auxiliary frame hinged to the front of the main frame, a rod extending axially through the hinge and held against rotation, a cutter bar carried at the front of the auxiliary frame, a roller mounted to rotate upon the rod, a traveling apron passing over the roller and extending adjacent to the cutter bar, a shaft journaled in the main frame, transmission means connecting the shaft with the roller, and means carried by the main frame for rotating the shaft.

3. In a harvesting and threshing machine, a wheel-supported main frame, a rod extending along the forward side of the main frame and held against rotation, an auxiliary frame hinged upon the rod, harvesting mechanism carried by the auxiliary frame, members mounted to rotate upon the rod, a shaft journaled in the main frame, means to transmit motion from the shaft to the rotatable members, and means to transmit motion from the rotatable members to the harvesting mechanism.

4. In a harvesting and threshing machine, a table having a cutter-bar at its forward end and supported by a ground wheel, a housing at the end of the table extending across the path of travel of said wheel and having its front end forward thereof, said housing being inclined at its forward end adjacent the cutter bar, a reel mounted to rotate above the cutter bar, and auxiliary slat sections carried by the reel adapted to automatically tilt in passing over the inclination of the housing and means whereby the sections are returned to initial operative position.

5. In a harvesting and threshing machine, a table supported by a ground wheel, a cutter bar at the front end of the table, a housing at the end of the table extending across the path of travel of said wheel and having its front end forward thereof and having an inclined forward end, a reel rotating above the cutter-bar, auxiliary slat sections formed at the end of the reel adjacent said wheel and yieldable means to hold the slat sections normally in alinement with the main reel slats, said auxiliary slat sections being caused to move out of alinement with the main reel slats by engagement with the inclined walls of the housing.

6. In a harvesting and threshing machine, a table supported by a ground wheel, a cutter bar carried at the forward end of the table, a housing extending over a portion of the table spanning the path of travel of said wheel, and having its front end forward of said wheel, said housing having its forward end inclined both longitudinally and laterally relative to the line of travel, a reel mounted over the cutter bar, auxiliary reel sections mounted at the end of the main reel adjacent said ground wheel, and yieldable means to hold the auxiliary reel sections normally in alinement with the main reel slats, the extremities of the auxiliary reel sections engaging the inclined portion of said housing and caused thereby to follow the contour of the housing.

7. In a harvesting and threshing machine, a table, a cutter bar carried at the forward side of the table defining by its extremity the grain line, a ground wheel supporting the grain end of the table and mounted wholly without the grain line, a housing carried at the grain end of the table and spanning the path of travel of said wheel, said housing being inclined at its forward end both longitudinally and laterally relative to the line of travel, a reel mounted to rotate over the cutter bar and provided with a yielding section extending adjacent the grain line and adapted to follow the contour of the housing, and means to return the yielding section to initial position.

8. In a harvesting and threshing machine, a cutting table, an extension of said table comprising a housing formed at one end of the table and inclined laterally and longitudinally relative to the line of travel, a reel mounted above the table, and auxiliary reel slats pivoted intermediate their ends to the end of the reel adjacent said housing.

9. In a harvesting and threshing machine, a cutting table, a housing carried at each end of the cutting table, a reel mounted above the table, and auxiliary reel slats pivoted intermediate their ends at each end of the reel, the outer ends of said auxiliary slats being raised when passing the housing.

10. In a harvesting and threshing machine, a cutting table, a reel comprising a shaft with main slats stopping short of one end of the table and fixed with relation to the shaft, and auxiliary slats pivoted to said end of the reel and projecting beyond said main slats.

11. A harvesting and threshing machine comprising a wheel supported frame, conveyer means on the frame, a cutter bar at the front of the frame having its grain end substantally at the grainward side of the machine, a reel, an inclined housing at the grain end of the machine extending across the path of travel of the adjacent wheel, its front edge being at the rear of the cutter bar, and auxiliary means attached to the reel for moving the grain from in front of the housing to the conveyer means.

12. In a harvesting and threshing machine, a cutting table, supporting wheels in the rear of the table, a housing entirely closed at each end of the table and extending over the line of travel of said wheels, and a cutter-bar secured to the forward side of said table and extending in front of said housings.

13. In a harvesting and threshing machine, a main frame or platform, hinges, an auxiliary platform secured thereby to the front end of said platform, a pintle rod threading said hinges, rollers adapted to carry a traveling-apron or draper revolubly mounted upon said rod, and means surrounding the rod and attached to the main platform for supporting the auxiliary platform and the rollers.

14. In a harvesting and threshing machine, a wheel-supported main frame, an auxiliary frame in front of the main frame, a rod extending longitudinally of the auxiliary frame at its rear side and held against rotation, power transmission mechanism sleeved about the rod and rotating independently thereof, hinge members carried by the main frame adapted to engage with the rod to articulate the auxiliary frame upon the main frame, and cutting mechanism carried by the auxiliary frame.

15. In a harvesting and threshing machine, a wheel-supported main frame, an auxiliary frame hinged to the main frame, cutting mechanism carried by the auxiliary frame, a rod forming the pintle of a hinge between the frames and held against rotation with respect to one of the frames, driving mechanism carried by the main frame, and means sleeved about the rod for transmitting motion from the driving mechanism to the cutting mechanism.

16. In a harvesting and threshing machine, a wheel-supported main frame, an auxiliary frame hinged to and in front of the main frame, a rod forming the pintle of a hinge between the frames and held against rotation, driving mechanism carried by the main frame, driven mechanism carried by the auxiliary frame, and power transmission mechanism sleeved about said rod and rotating independently thereof.

17. In a harvesting and threshing machine, a main frame, an auxiliary frame in advance of the main frame, a hinge connecting said frames together including a rod on one of the frames extending longitudinally thereof, a hinge member pivoted upon said rod, a slotted member carried rigidly by the other frame adapted to slidably engage with the rod and means for connecting the hinge member on the rod to the slotted member.

18. In a harvesting and threshing machine, a main frame, an auxiliary frame in advance of the main frame, cutting mechanism carried by the auxiliary frame, a hinge connecting said frames together including a rod on one of the frames extending longitudinally thereof, a hinge member pivoted upon said rod, and a slotted member carried rigidly by the other frame adapted to slidably engage with the rod and means for connecting the hinge member on the rod to the slotted member.

19. In a harvesting and threshing machine, a cutting table, a cutter-bar secured to the forward side thereof, aprons or drapers operably mounted upon the table, supporting wheels in the rear of the table, and a housing at each end of the table extending over the line of travel of said wheels inclined toward the front and laterally toward the drapers, and means for brushing the grain severed by the cutter-bar in front of the housings onto the drapers.

20. In a harvesting and threshing machine, a main platform, an auxiliary platform hinged to the front end thereof, rollers adapted to carry a traveling apron, revolubly mounted on the auxiliary platform concentric with the axis of the platform hinge, and a flap member hinged to the main platform below said rollers and overlapping the adjacent edge of the auxiliary platform.

21. In a harvesting and threshing machine, a cutting table, a cutter-bar secured to the forward side thereof, traveling aprons mounted upon the table, power transmitting mechanism connected to said cutter-bar and to said aprons, said transmitting mechanism extending longitudinally of said table, between the aprons, and a wedge-shaped housing centrally disposed on the table in the rear of the cutter-bar, adapted to cover said mechanism and to direct the grain upon the aprons at opposite sides thereof.

In testimony whereof I affix my signature in presence of two witnesses.

JOHN D. JONES.

Witnesses:
   EUGENE C. BROWN,
   ERNEST H. AHOMS.